(12) United States Patent
Maekawa

(10) Patent No.: US 11,173,857 B2
(45) Date of Patent: Nov. 16, 2021

(54) CONTROL DEVICE FOR ON-BOARD POWER SUPPLY UNIT, AND ON-BOARD POWER SUPPLY DEVICE WITH A PROTECTIVE RELAY

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Kosei Maekawa, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 143 days.

(21) Appl. No.: 16/491,342

(22) PCT Filed: Feb. 15, 2018

(86) PCT No.: PCT/JP2018/005328
§ 371 (c)(1),
(2) Date: Sep. 5, 2019

(87) PCT Pub. No.: WO2018/163751
PCT Pub. Date: Sep. 13, 2018

(65) Prior Publication Data
US 2020/0023794 A1  Jan. 23, 2020

(30) Foreign Application Priority Data

Mar. 8, 2017  (JP) .............................. JP2017-043429

(51) Int. Cl.
*H02J 7/00*       (2006.01)
*B60R 16/033*   (2006.01)

(52) U.S. Cl.
CPC .......... *B60R 16/033* (2013.01); *H02J 7/0063* (2013.01)

(58) Field of Classification Search
CPC .................................................... B60R 16/033
(Continued)

(56) References Cited

U.S. PATENT DOCUMENTS

2004/0204797 A1* 10/2004 Vickers ................. B60W 20/00
   701/1
2013/0320931 A1* 12/2013 Yoshida ................ B60R 16/033
   320/135
(Continued)

FOREIGN PATENT DOCUMENTS

DE      102015206523      10/2016
JP      H5-227607 A        9/1993
(Continued)

OTHER PUBLICATIONS

International Search Report, Application No. PCT/JP2018/005328, dated Apr. 24, 2018. ISA/Japan Patent Office.

*Primary Examiner* — Yalkew Fantu
(74) *Attorney, Agent, or Firm* — Honigman LLP

(57) ABSTRACT

A control device for an on-board power supply unit includes a bypass conduction path that serves as a path for supplying power from a first position between power storage units in an on-board power supply unit to a second conduction path, a bypass relay that is interposed in the bypass conduction path, and a protective relay that is disposed between power storage units at a position farther toward a high-potential side than the first position. A control unit switches between first switching control for turning on the protective relay and turning off the bypass relay and second switching control for turning off the protective relay and turning on the bypass relay.

11 Claims, 6 Drawing Sheets

(58) Field of Classification Search
USPC .......................................................... 320/118
See application file for complete search history.

(56) References Cited

U.S. PATENT DOCUMENTS

| 2015/0183329 | A1* | 7/2015 | Nakaya | ................... | H02S 40/38 |
| | | | | | 307/9.1 |
| 2019/0115176 | A1* | 4/2019 | Yasunori | ................. | B60R 16/02 |

FOREIGN PATENT DOCUMENTS

| JP | H6-255402 A | 9/1994 |
| JP | 3039119 B2 | 5/2000 |
| JP | 2010-081703 A | 4/2010 |
| JP | 2010081703 * | 8/2010 |

* cited by examiner

> US 11,173,857 B2

CONTROL DEVICE FOR ON-BOARD POWER SUPPLY UNIT, AND ON-BOARD POWER SUPPLY DEVICE WITH A PROTECTIVE RELAY

CROSS-REFERENCE TO RELATED APPLICATIONS

This application is the U.S. national stage of PCT/JP2018/005328 filed on Feb. 15, 2018, which claims priority of Japanese Patent Application No. JP 2017-043429 filed on Mar. 8, 2017, the contents of which are incorporated herein.

TECHNICAL FIELD

The present disclosure relates to a control device for an on-board power supply unit, and an on-board power supply device.

BACKGROUND

Systems that supply power to two systems, i.e., a low-voltage system and a high-voltage system, are known as systems for use on board vehicles, and a technique disclosed in Patent Document 1 is proposed as a technique related to such a system. The vehicle power supply device disclosed in Patent Document 1 includes a high-voltage secondary battery connected to a first load of a high-voltage system, and a low-voltage secondary battery connected to a second load of a low-voltage system. In addition, a third load is connected in parallel with the second load via a switch. This vehicle power supply device performs control so that, when a voltage detected by a voltage detection means is lower than or equal to a first predetermined value, the vehicle power supply device causes a voltage converter to operate and converts high voltage into low voltage to charge the low-voltage secondary battery, and the vehicle power supply device closes the switch connected to the third load until the low-voltage secondary battery is charged to a predetermined value when a load current detected by a load current detection means is smaller than or equal to a second predetermined value and opens the switch when the load current is greater than the second predetermined value.

In a system that supplies power to two systems, i.e., a low-voltage system and a high-voltage system, the necessity of a power supply unit for the low-voltage system can be reduced or eliminated and a power supply unit for the low-voltage system can be reduced or made smaller in size by providing a power supply unit for the high-voltage system and stepping down the voltage of the output of the power supply unit for the high-voltage system to make the output available also to loads of the low-voltage system, as disclosed in Patent Document 1. With this configuration, however, if a failure occurs in the power supply unit for the high-voltage system and it becomes impossible to properly supply power from the power supply unit for the high-voltage system, it also becomes impossible to properly supply power to the low-voltage system.

The present disclosure has been made based on the above-described circumstances, and aims to provide a control device for an on-board power supply unit and an on-board power supply device that are capable of supplying, to a low-voltage side path, power based on a power storage unit located farther toward a low-voltage side than a predetermined position in an on-board power supply unit even if an abnormality occurs at a position father toward a high-voltage side than the predetermined position.

SUMMARY

A control device for an on-board power supply unit of a first aspect of the present disclosure includes a voltage conversion unit that is connected to a first conduction path and a second conduction path and performs a step-down operation of stepping down a voltage applied to the first conduction path and applying the stepped-down voltage to the second conduction path. The first conduction path is a path on which power is supplied from an on-board power supply unit including a plurality of power storage units connected in series. The second conduction path serves as a path for supplying power to a load. A bypass conduction path serves as a path for supplying power to the second conduction path from a first position between power storage units in the on-board power supply unit. A bypass relay is interposed in the bypass conduction path, the bypass relay permits power to be supplied from the first position-side to the second conduction path-side when the bypass relay is turned on and interrupting the supply of power from the first position-side to the second conduction path-side when the bypass relay is turned off. A protective relay is connected in series with the plurality of power storage units in the on-board power supply unit and is disposed between power storage units at a position farther toward a high-potential side than the first position. The protective relay switches an inter-power storage unit path between a low-potential-side power storage unit disposed farther toward a low-potential side than the protective relay and a high-potential-side power storage unit disposed farther toward the high-potential side than the protective relay in the on-board power supply unit to an electrically connected state when the protective relay is turned on and switches the inter-power storage unit path to an electrically disconnected state when the protective relay is turned off. A control unit switches at least between first switching control for turning on the protective relay and turning off the bypass relay and second switching control for turning off the protective relay and turning on the bypass relay.

A control device for an on-board power supply unit of a second aspect of the present disclosure includes a voltage conversion unit that is connected to a first conduction path and a second conduction path and performs a step-down operation of stepping down a voltage applied to the first conduction path and applying the stepped-down voltage to the second conduction path. The first conduction path is a path on which power is supplied from an on-board power supply unit including a plurality of power storage units connected in series. The second conduction path serves as a path for supplying power to a load. A bypass conduction path serves as a path for supplying power to the second conduction path from a first position between power storage units in the on-board power supply unit. A diode is interposed in the bypass conduction path. The diode has an anode that is electrically connected to the first position-side and a cathode that is electrically connected to the second conduction path-side. A protective relay is connected in series with the plurality of power storage units in the on-board power supply unit and is disposed between power storage units at a position farther toward a high-potential side than the first position. The protective relay switches an inter-power storage unit path between a low-potential-side power storage unit disposed farther toward a low-potential side than the protective relay and a high-potential-side power storage unit disposed farther toward the high-potential side than the protective relay in the on-board power supply unit to an electrically connected state when the protective relay is turned on and switches the inter-power storage unit path to an electrically disconnected state when the protective relay is turned off. A control unit that switches at least between first switching control for turning on the protective relay and second switching control for turning off the protective relay.

An on-board power supply device of a third aspect of the present disclosure includes one of the above-described control devices, each of which is for an on-board power supply unit; and an on-board power supply unit.

Advantageous Effects of Disclosure

In the control device of the first aspect, the protective relay is turned on and the bypass relay is turned off when the control unit switches to the first switching control. During this state, a relatively high voltage can be applied to the first conduction path, which serves as the conduction path of a high-voltage system, based on power supplied from the on-board power supply unit, and a stepped-down voltage can be applied to the second conduction path, which serves as the conduction path of a low-voltage system, due to the operation of the voltage conversion unit. Accordingly, power can be supplied to both the conduction path of the high-voltage system and the conduction path of the low-voltage system, based on power from the on-board power supply unit. Furthermore, the control unit can also switch to the second switching control, and in this case, the protective relay is turned off and the bypass relay is turned on. If the second switching control is executed by the control unit, the high-potential-side power storage unit and the low-potential-side power storage unit are electrically disconnected because the protective relay is turned off, and power supplied from the low-potential-side power storage unit is supplied to the second conduction path-side via the bypass conduction path because the bypass relay is turned on. Due to such a configuration, even if an abnormality occurs farther toward the high voltage-side than the protective relay, power based on the low-potential-side power storage unit can be supplied to the low-voltage system while the connection between the side at which the abnormality has occurred and the low-potential-side power storage unit is reliably interrupted if switching to the second switching control is performed, and a situation in which power based on the on-board power supply unit stops being supplied to the low-voltage system can be more readily avoided.

In the control device of the second aspect, the protective relay is turned on when the control unit switches to the first switching control. During this state, a relatively high voltage can be applied to the first conduction path, which serves as the conduction path of a high-voltage system, based on the power supplied from the on-board power supply unit, and a stepped-down voltage can be applied to the second conduction path, which serves as the conduction path of a low-voltage system, due to the operation of the voltage conversion unit. Accordingly, power can be supplied to both the conduction path of the high-voltage system and the conduction path of the low-voltage system, based on power from the on-board power supply unit. Furthermore, the control unit can also switch to the second switching control, and in this case, the protective relay is turned off. If the second switching control is executed by the control unit, the protective relay is turned off, and thus, the high-potential-side power storage unit and the low-potential-side power storage unit are electrically disconnected. In this case, even if the desired voltage stops being output from the voltage conversion unit to the second conduction path, a discharge current from the low-potential-side power storage unit flows into the second conduction path-side via the bypass conduction path once the cathode-side potential of the diode, which is disposed in the bypass conduction path, becomes lower than the anode-side potential. Due to such a configuration, even if an abnormality occurs farther toward the high voltage-side than the protective relay, power based on the low-potential-side power storage unit can be supplied to the low-voltage system while the connection between the side at which the abnormality has occurred and the low-potential-side power storage unit is reliably interrupted if switching to the second switching control is performed, and a situation in which power based on the on-board power supply unit stops being supplied to the low-voltage system can be more readily avoided.

The on-board power supply device of the third aspect achieves effects similar to those of the control device for an on-board power supply unit, of the first or second aspect.

DETAILED DESCRIPTION OF PREFERRED EMBODIMENTS

Figure 1:
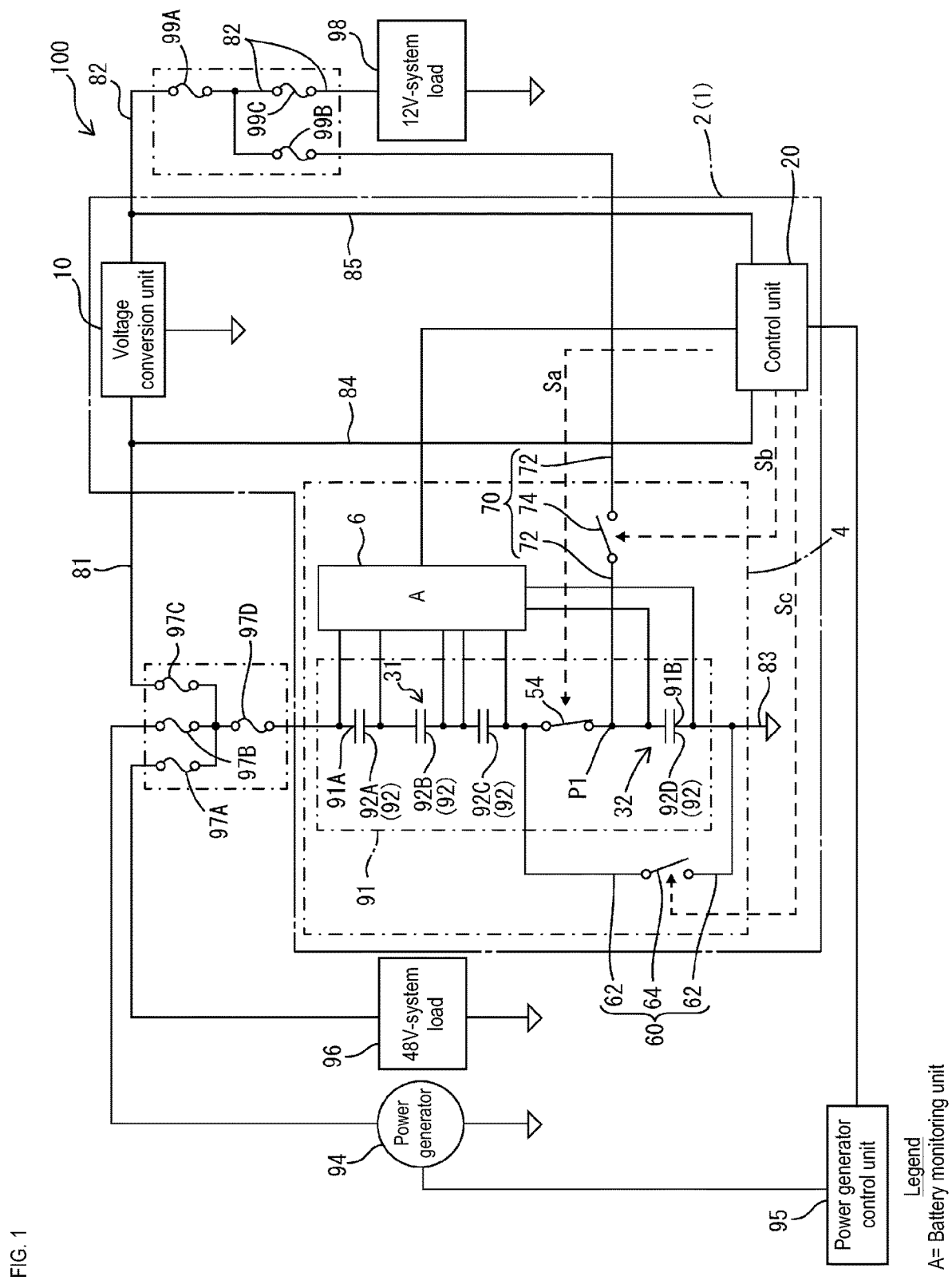
FIG. 1 is a block diagram schematically illustrating an example of an on-board power supply system including an on-board power supply device and a control device for an on-board power supply unit in Embodiment 1.

Here, desirable examples of the present disclosure will be described. However, the present disclosure is not limited to the following examples.

An internal abnormality detection unit that detects an abnormality at a predetermined in-device position located farther toward the high-potential side than the protective relay may also be included. The control unit may also be configured to switch to the first switching control if the internal abnormality detection unit is not detecting an abnormality at the predetermined in-device position and to switch to the second switching control if the internal abnormality detection unit detects an abnormality at the in-device position.

In this control device, the control unit switches to the first switching control if an abnormality at the predetermined in-device position, which is located farther toward the high-potential side than the protective relay, is not being detected. In this case, power based on the on-board power supply unit can be supplied to both the conduction path of the high-voltage system and the conduction path of the low-voltage system. On the other hand, if an abnormality is detected at the predetermined in-device position, which is located farther toward the high-potential side than the protective relay, the control unit switches to the second switching control, and thus, the connection between the side at which the abnormality has occurred and the low-potential-side power storage unit can be reliably interrupted, and the influence of the abnormality can be suppressed from spreading to the low-potential-side power storage unit. Furthermore, power based on the low-potential-side power storage unit can be supplied to the low-voltage system in a state as described above in which the influence of the abnormality is suppressed. Accordingly, power can be stably supplied to the low-voltage system more readily even if an abnormality occurs farther toward the high-potential side than the protective relay.

The "abnormality at a predetermined in-device position located farther toward the high-potential side than the protective relay" may also be an abnormality at a portion located farther toward the high-potential side than the protective relay in the on-board power supply unit, or may also be an abnormality (failure) of the voltage conversion unit, an abnormality of a path connected to the voltage conversion unit (an input-side conduction path or the like), or the like.

The internal abnormality detection unit may include a high-potential-side abnormality detection unit that detects an abnormality at a high-potential-side portion located farther toward the high-potential side than the protective relay in the on-board power supply unit. The control unit may function so as to switch to the first switching control if the high-potential-side abnormality detection unit is not detecting an abnormality at the high-potential-side portion and to switch to the second switching control if the high-potential-side abnormality detection unit detects an abnormality at the high-potential-side portion.

Due to the control unit switching to the first switching control if an abnormality is not being detected at a portion located farther toward the high-potential side than the protective relay in the on-board power supply unit, this control device can supply power based on the on-board power supply unit to both the conduction path of the high-voltage system and the conduction path of the low-voltage system in this case. On the other hand, if an abnormality is detected at a portion located farther toward the high-potential side than the protective relay in the on-board power supply unit, the control unit switches to the second switching control, and thus, the connection between the high-potential-side power storage unit present at the side at which the abnormality has occurred and the low-potential-side power storage unit can be reliably interrupted, and the influence of the abnormality can be suppressed from spreading to the low-potential-side power storage unit. Furthermore, power based on the low-potential-side power storage unit can be supplied to the low-voltage system in a state as described above in which the influence of the abnormality is suppressed. Accordingly, power can be stably supplied to the low-voltage system more readily even if an abnormality occurs near the high-potential-side power storage unit.

The control device may also include a parallel relay that is connected in parallel with the protective relay and the low-potential-side power storage unit, the parallel relay electrically connecting the high-potential-side power storage unit and a third conduction path when the parallel relay is turned on and electrically disconnecting the high-potential-side power storage unit and the third conduction path when the parallel relay is turned off, the third connection path being a path to which a terminal having the lowest potential in the on-board power supply unit is electrically connected. The control unit may be configured to be capable of switching to third switching control for turning off the protective relay and turning on the parallel relay, and may function so as to turn off the parallel relay when executing the first switching control and the second switching control.

In the above-described control device, the protective relay is turned off and the parallel relay is turned on if the control unit switches to the third switching control. That is, the connection between the low-potential-side power storage unit and the high-potential-side power storage unit is electrically interrupted, and the high-potential-side power storage unit and the third conduction path are electrically connected. Accordingly, even if an abnormality occurs in the low-potential-side power storage unit, power based on the high-potential-side power storage unit can be supplied to the first conduction path while the influence of the abnormality having occurred at the low-potential-side power storage unit is suppressed if switching to the third switching control is performed, and a stepped-down voltage can also be applied to the second conduction path, which serves as the conduction path of the low-voltage system, due to the operation of the voltage conversion unit.

The control device may also include a low-potential-side abnormality detection unit that detects an abnormality at a low-potential-side portion located farther toward the low-potential side than the protective relay in the on-board power supply unit. The control unit may function so as to switch to the first switching control if the low-potential-side abnormality detection unit is not detecting an abnormality at the low-potential-side portion and to switch to the third switching control if the low-potential-side abnormality detection unit detects an abnormality at the low-potential-side portion.

Due to the control unit switching to the first switching control on the condition that an abnormality is not being detected at a portion located farther toward the low-potential side than the protective relay in the on-board power supply unit, this control device can supply power based on the on-board power supply unit to both the conduction path of the high-voltage system and the conduction path of the low-voltage system in this case. On the other hand, if an abnormality is detected at a portion located farther toward the low-potential side than the protective relay, the control unit switches to the third switching control, and thus, the connection between the low-potential-side power storage unit present at the side at which the abnormality has occurred and the high-potential-side power storage unit can be reliably interrupted, and the influence of the abnormality can be suppressed from spreading to the high-potential-side power storage unit. Furthermore, power based on the high-potential-side power storage unit can be supplied to the low-voltage system in a state as described above in which the influence of the abnormality is suppressed. Accordingly, power can be stably supplied to the low-voltage system more readily even if an abnormality occurs near the low-potential-side power storage unit.

Embodiment 1

In the following, Embodiment 1 for implementing the present disclosure will be described.

An on-board power supply system 100 (also referred to in the following as a "power supply system 100") illustrated in FIG. 1 is configured as a system capable of supplying power to two systems, i.e., a first conduction path 81 that is a power supply path of a high-voltage system and a second conduction path 82 that is a power supply path of a low-voltage system. The power supply system 100 is a power supply system that applies a relatively-high voltage (e.g., around 48 V) to the first conduction path 81 of the high-voltage system, and applies a relatively-low voltage (e.g., around 12 V) to the second conduction path 82 of the low-voltage system, and is configured as a system that can supply power to electric devices connected to the first conduction path 81 and the second conduction path 82.

A load 96 of the high-voltage system is a known on-board electric device mounted on board a vehicle, and is electrically connected to the first conduction path 81 of the high-voltage system and is capable of operating on power supplied via the first conduction path 81. The type of and the quantity of the load 96 of the high-voltage system are not limited. For example, a heater or the like may be used as the load 96, or a device other than this may be used as the load 96. Note that the load 96 of the high-voltage system is also referred to as a "48 V-system load 96".

A load 98 of the low-voltage system is a known on-board electric device mounted on board a vehicle, and is electrically connected to the second conduction path 82 of the low-voltage system and is capable of operating on power supplied via the second conduction path 82. The type of and the quantity of the load 98 of the low-voltage system are not limited. For example, a headlight, an audio device, a navigation system, an electric parking brake, a shift-by-wire system, or the like may be used as the load 98, or a device other than these devices may be used as the load 98. Note that the load 98 of the low-voltage system is also referred to as a "12 V-system load 98".

The power supply system 100 mainly includes a power generator 94, an on-board power supply device 1 (also referred to in the following as a "power supply device 1"), the first conduction path 81, the second conduction path 82, and the like. The power generator 94, an on-board power supply unit 91 (also referred to in the following as a "power supply unit 91"), the load 96 of the high-voltage system, and the like are electrically connected to the first conduction path 81 of the high-voltage system. The load 98 of the low-voltage system is electrically connected to the second conduction path 82 of the low-voltage system. The first conduction path 81 is electrically connected to the power supply unit 91 and is a path on which power is supplied from the power supply unit 91, and the first conduction path 81 is a path to which a relatively-high voltage (e.g., around 48 V) is applied. Fuses 97B and 97C are interposed in the first conduction path 81. The second conduction path 82 is a path that supplies power to a load (specifically, the load 98 of the low-voltage system) based on the output from a voltage conversion unit 10 or based on power transmission via a bypass conduction path 72, and the second conduction path 82 is a path to which a relatively-low voltage (e.g., around 12 V) compared to the voltage of the first conduction path 81 is applied. Fuses 99A and 99C are interposed in the second conduction path 82.

The power generator 94 is configured as a known on-board power generator, and has the function of generating power when a rotary shaft of an engine (unillustrated in the drawings) rotates. If the power generator 94 operates, the power generated by the power generator 94 is rectified and then supplied to the first conduction path 81 as direct-current power. The power generator 94, during power generation, applies an output voltage having a predetermined value Va (e.g., around 48 V) for example, to the first conduction path 81. Note that an unillustrated starter is also connected to the first conduction path 81, and the starter operates by receiving power supplied from the power supply unit 91 when the engine is in a stopped state, and provides the engine with a starting torque.

The power supply device 1 mainly includes a high-voltage system unit 4, the voltage conversion unit 10, a control unit 20, and the like. A control device 2 for the on-board power supply unit (also simply referred to in the following as a "control device 2") may also be configured to be indistinguishable from the power supply device 1, or may also be a portion of the power supply device 1 excluding a plurality of power storage units 92. In the following description, the portion of the power supply device 1 excluding the plurality of power storage units 92 is regarded as the control device 2. Also, a battery monitoring unit 6 and the power storage units 92 may also be configured as an integrated unit, or may also be configured as separate members. In the following description, an example in which the battery monitoring unit 6 and the power storage units 92 are integrated will be described as a typical example.

The control unit 20 is an on-board electronic control device that can receive information from the battery monitoring unit 6, can control the switching of relays (a protective relay 54, a parallel relay 64, a bypass relay 74), etc., and includes various devices, such as a storage device, an AD converter, and an information processing device such as a CPU. The voltages of the first conduction path 81 and the second conduction path 82 are input to the control unit 20 via conduction paths 84 and 85, and the control unit 20 is configured to be capable of detecting the voltages of the first conduction path 81 and the second conduction path 82. Note that the control unit 20 may also be constituted by a single electronic control device or may also be constituted by a plurality of electronic control devices. The specific functions that the control unit 20 is capable of carrying out will be described later.

The voltage conversion unit 10 is disposed between the second conduction path 82 and the first conduction path 81 electrically connected to the power supply unit 91, in a state in which the voltage conversion unit 10 is connected to these conduction paths. The voltage conversion unit 10 is a circuit that can perform a step-down operation of stepping down the voltage applied to the first conduction path 81 and applying the stepped-down voltage to the second conduction path 82. The voltage conversion unit 10 can be configured, for example, as a known step-down DC/DC converter including a semiconductor switching element, an inductor, etc., and in specific, a non-isolated DC/DC converter of the synchronous rectification type, a non-isolated DC/DC converter of the diode type, or the like can be suitably used as the voltage conversion unit 10.

For example, if the voltage conversion unit 10 is configured as a non-isolated DC/DC converter of the synchronous rectification type, the voltage conversion unit 10 can be controlled by a control circuit of either an unillustrated control means or the control unit 20. The control circuit provides the voltage conversion unit 10 with a control signal (PWM signal) for the step-down operation, and feedback control of the control signal (PWM signal) is performed so that the voltage applied to the first conduction path 81 (e.g., a voltage of around 48 V) is stepped down and a desired target voltage Vb (e.g., 12 V) is applied to the second conduction path 82. The duty of the control signal (PWM signal) is adjusted through a feedback calculation.

The high-voltage system unit 4 includes the power supply unit 91, the protective relay 54, the battery monitoring unit 6, a bypass circuit portion 70, a parallel circuit portion 60, and the like.

The power supply unit 91 has a configuration in which the plurality of power storage units 92 are connected in series. Each power storage unit 92 is cconstituted by a known on-board power storage means such as a lead battery, an electric double layer capacitor, or a lithium-ion battery, for example, and is electrically connected to the first conduction path 81 via the fuse 97D. The power supply unit 91 has an output voltage of 48 V, for example, when the power supply unit 91 is fully charged, and a terminal 91A with the highest potential is maintained at around 48V when the power supply unit 91 is fully charged. A low-potential-side terminal 91B of the power supply unit 91 is maintained at the ground potential (0 V), for example. A third conduction path 83 to which the terminal 91B is connected is a reference conduction path that is configured as a ground. In the example illustrated in FIG. 1, the power supply unit 91 is configured in a state in which four power storage units 92 are connected in series, and the inter-terminal voltage of each power storage unit 92 is maintained at around 12 V when each power storage unit 92 is fully charged, for example. Note that among the plurality of power storage units 92, high-potential-side power storage units 92A, 92B, and 92C are power storage units located farther toward the high-potential side than the protective relay 54, and a low-potential-side power storage unit 92D is a power storage unit located farther toward the low-potential side than the protective relay 54.

The battery monitoring unit 6 is a monitoring circuit that monitors the plurality of power storage units 92, and specifically, the battery monitoring unit 6 has the function of monitoring the inter-terminal voltage (the difference in potential between the low-potential-side terminal and the high-potential-side terminal) of each power storage unit 92. Note that in the following description, V1, V2, and V3 respectively indicate the inter-terminal voltages of the high-potential-side power storage units 92A, 92B, and 92C, which are detected by the battery monitoring unit 6, and V4 indicates the inter-terminal voltage of the low-potential-side power storage unit 92D, which is detected by the battery monitoring unit 6. The battery monitoring unit 6 has the function of transmitting, to the control unit 20, the inter-terminal voltages V1, V2, V3, and V4 of the high-potential-side power storage units 92A, 92B, and 92C and the low-potential-side power storage unit 92D.

The protective relay 54 is a relay constituted by using one or more mechanical relays or semiconductor switches, such as MOSFETs and bipolar transistors, and it suffices for the protective relay 54 to have a configuration such that the protective relay 54 is electrically connected and permits bidirectional conduction when the protective relay 54 is turned on, and the protective relay 54 is electrically disconnected and inhibits bidirectional conduction when the protective relay 54 is turned off. In the power supply unit 91, the protective relay 54 is connected in series with the plurality of power storage units 92 and is disposed between power storage units at a position farther toward the high-potential side than a later-described first position P1. The protective relay 54 is configured to switch an inter-power storage unit path to an electrically connected state when the protective relay 54 is turned on and to switch the inter-power storage unit path to an electrically disconnected state when the protective relay 54 is turned off. The inter-power storage unit path is the path between the low-potential-side power storage unit 92D, which is disposed farther toward the low-potential side than the protective relay 54, and the high-potential-side power storage units 92A, 92B, and 92C, which are disposed farther toward the high-potential side than the protective relay 54. Specifically, the protective relay 54 is disposed between the low-potential-side power storage unit 92D, which is disposed furthest toward the low-potential side among the plurality of power storage units 92 constituting the power supply unit 91, and the high-potential-side power storage unit 92C, which is disposed furthest toward the low-potential side among the plurality of high-potential-side power storage units 92A, 92B, and 92C. When the protective relay 54 is turned on, the low-potential-side power storage unit 92D and the high-potential-side power storage unit 92C are electrically connected, and a current can flow between the low-potential-side power storage unit 92D and the high-potential-side power storage unit 92C. When the protective relay 54 is turned off, the connection between the low-potential-side power storage unit 92D and the high-potential-side power storage unit 92C is electrically interrupted, and no current flows between the low-potential-side power storage unit 92D and the high-potential-side power storage unit 92C.

The bypass circuit portion 70 mainly includes the bypass conduction path 72 and the bypass relay 74. The bypass conduction path 72 is a path that supplies power to the second conduction path 82 from the first position P1 between power storage units in the power supply unit 91. The first position P1 is a position between the protective relay 54 and the low-potential-side power storage unit 92D, along the path connecting the low-potential-side terminal of the high-potential-side power storage unit 92C and the high-potential-side terminal of the low-potential-side power storage unit 92D. The bypass relay 74 is a relay constituted by using one or more mechanical relays or semiconductor switches, such as MOSFETs and bipolar transistors, and is interposed in the bypass conduction path 72. The bypass relay 74 is a relay functioning such that the bypass relay 74 permits power to be supplied from the first position P1-side to the second conduction path 82-side when the bypass relay 74 is turned on and interrupts the supply of power from the first position P1-side to the second conduction path 82-side when the bypass relay 74 is turned off. Note that a fuse 99B is interposed in the bypass conduction path 72, between the bypass relay 74 and the second conduction path 82.

The parallel circuit portion 60 is a circuit portion that is connected in parallel with a serial structure portion in which the protective relay 54 and the low-potential-side power storage unit 92D are connected in series, and mainly includes a parallel conduction path 62 and the parallel relay 64. The parallel conduction path 62 is a conduction path that electrically connects the low-potential-side terminal of the high-potential-side power storage unit 92C and the third conduction path 83 when the parallel relay 64 is turned on. The parallel relay 64 is a relay configured by using one or more mechanical relays or semiconductor switches, such as MOSFETs and bipolar transistors, and electrically connects the high-potential-side power storage unit 92C and the third conduction path 83 (the conduction path to which the terminal having the lowest potential in the power supply unit 91 (specifically, the low-potential-side terminal of the low-potential-side power storage unit 92D) is electrically connected) when the parallel relay 64 is turned on and electrically disconnects the high-potential-side power storage unit 92C and the third conduction path 83 when the parallel relay 64 is turned off.

Next, control performed by the control unit 20 will be described.

Figure 2:
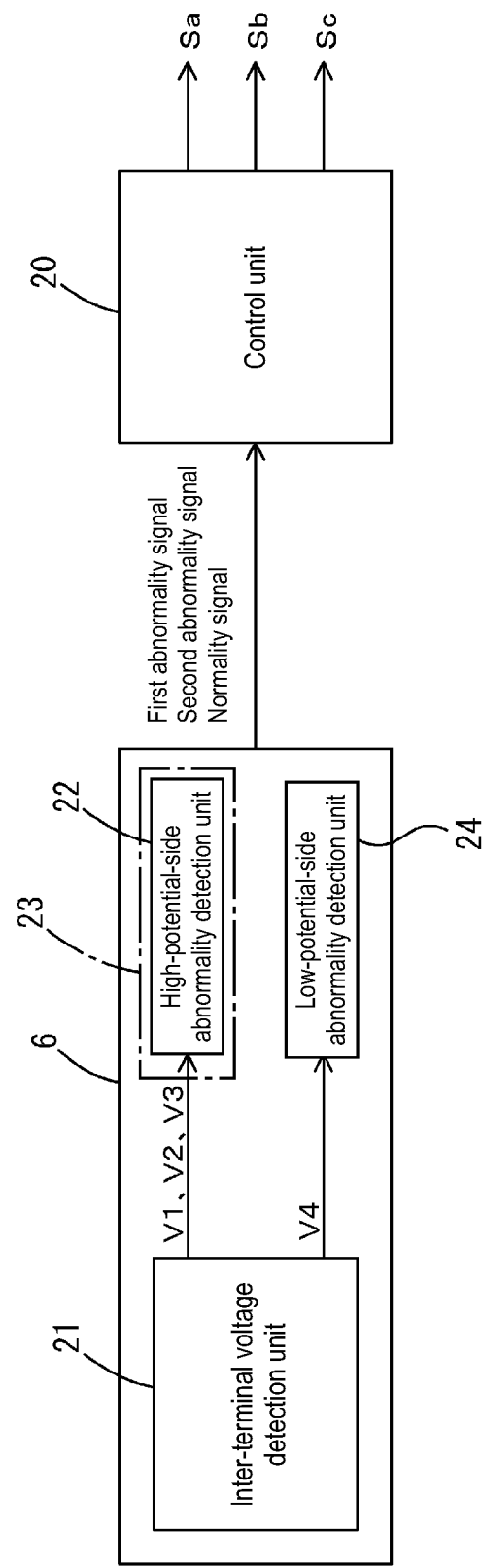
FIG. 2 is an explanatory diagram illustrating functions executed by a battery monitoring unit and a control unit.

The control device 2 includes a high-potential-side abnormality detection unit 22 and a low-potential-side abnormality detection unit 24, as illustrated in FIG. 2. The highpotential-side abnormality detection unit 22 and the low-potential-side abnormality detection unit 24 may be provided in the battery monitoring unit 6 or in the control unit 20. In the following, as shown in FIG. 2, an example in which the high-potential-side abnormality detection unit 22 and the low-potential-side abnormality detection unit 24 are provided in the battery monitoring unit 6 will be described as a typical example.

As illustrated in FIG. 1, the voltages of both ends (the voltage of the high-potential-side terminal and the voltage of the low-potential-side terminal) of each of the plurality of power storage units 92 are input to the battery monitoring unit 6, and the battery monitoring unit 6 is capable of detecting the inter-terminal voltage of each power storage unit 92, as described above. In FIG. 2, the function in the battery monitoring unit 6 of detecting the inter-terminal voltage of each power storage unit 92 is illustrated as an inter-terminal voltage detection unit 21, and the inter-terminal voltages of the high-potential-side power storage units 92A, 92B, and 92C, which are detected by the inter-terminal voltage detection unit 21, are schematically illustrated as V1, V2, and V3, respectively, and the inter-terminal voltage of the low-potential-side power storage unit 92D, which is detected by the inter-terminal voltage detection unit 21, is schematically illustrated as V4.

As illustrated in FIG. 2, the high-potential-side abnormality detection unit 22, which is provided in the battery monitoring unit 6, functions as an internal abnormality detection unit 23. This high-potential-side abnormality detection unit 22 detects an abnormality at a portion 31 located farther toward the high-potential side than the protective relay 54 in the power supply unit 91 illustrated in FIG. 1. In this example, the position of the high-potential-side portion 31 corresponds to one example of a "predetermined in-device position". In the example illustrated in FIG. 1, the portion in which the high-potential-side power storage units 92A, 92B, and 92C are connected in series, within the area located farther toward the high-potential side than the protective relay 54 in the power supply unit 91, is the high-potential-side portion 31. The high-potential-side abnormality detection unit 22 compares each of the inter-terminal voltages V1, V2, and V3 of the high-potential-side power storage units 92A, 92B, and 92C with a reference voltage Vth, and outputs a first abnormality signal (a high-potential-side abnormality signal) to the control unit 20 if at least one of the inter-terminal voltages V1, V2, and V3 is lower than the reference voltage Vth. On the other hand, the high-potential-side abnormality detection unit 22 does not output the first abnormality signal (the high-potential-side abnormality signal) to the control unit 20 if none of the inter-terminal voltages V1, V2, and V3 is lower than the reference voltage Vth.

The low-potential-side abnormality detection unit 24, which is provided in the battery monitoring unit 6, detects an abnormality at a portion 32 located farther toward the low-potential side than the protective relay 54 in the power supply unit 91. In the example illustrated in FIG. 1, the portion of the low-potential-side power storage unit 92D, within the area located farther toward the low-potential side than the protective relay 54 in the power supply unit 91, is the low-potential-side portion 32. The low-potential-side abnormality detection unit 24 compares the inter-terminal voltage V4 of the low-potential-side power storage unit 92D with the reference voltage Vth, and outputs a second abnormality signal (a low-potential-side abnormality signal) to the control unit 20 if the inter-terminal voltage V4 is lower than the reference voltage Vth. On the other hand, the low-potential-side abnormality detection unit 24 does not output the second abnormality signal (the low-potential-side abnormality signal) to the control unit 20 if the inter-terminal voltage V4 is not lower than the reference voltage Vth.

The control unit 20 selectively performs one of first switching control, second switching control, and third switching control based on a monitoring result from the battery monitoring unit 6. Note that in FIGS. 1 and 2, a signal that the control unit 20 provides to the protective relay 54 is illustrated as a signal Sa, a signal that the control unit 20 provides to the bypass relay 74 is illustrated as a signal Sb, and a signal that the control unit 20 provides to the parallel relay 64 is illustrated as a signal Sc. The first switching control is control for turning on the protective relay 54, turning off the bypass relay 74, and turning off the parallel relay 64. If the control unit 20 executes the first switching control, the control unit 20 provides a signal as the signal Sa that is an instruction to turn on, and provides signals as the signals Sb and Sc that are instructions to turn off. The second switching control is control for turning off the protective relay 54, turning on the bypass relay 74, and turning off the parallel relay 64. If the control unit 20 executes the second switching control, the control unit 20 provides a signal as the signal Sb that is an instruction to turn on, and provides signals as the signals Sa and Sc that are instructions to turn off. The third switching control is control for turning off the protective relay 54, turning off the bypass relay 74, and turning on the parallel relay 64. If the control unit 20 executes the third switching control, the control unit 20 provides a signal as the signal Sc that is an instruction to turn on, and provides signals as the signals Sa and Sb that are instructions to turn off.

The control unit 20 performs the first switching control if neither the first abnormality signal (the high-potential-side abnormality signal) nor the second abnormality signal (the low-potential-side abnormality signal) is output from the battery monitoring unit 6, i.e., if a normality signal, which is neither the first abnormality signal nor the second abnormality signal, is provided from the battery monitoring unit 6. Hence, the control unit 20 performs the first switching control on the condition that the high-potential-side abnormality detection unit 22 is not detecting any abnormality at the high-potential-side portion 31 and the low-potential-side abnormality detection unit 24 is not detecting any abnormality at the low-potential-side portion 32.

Figure 4:
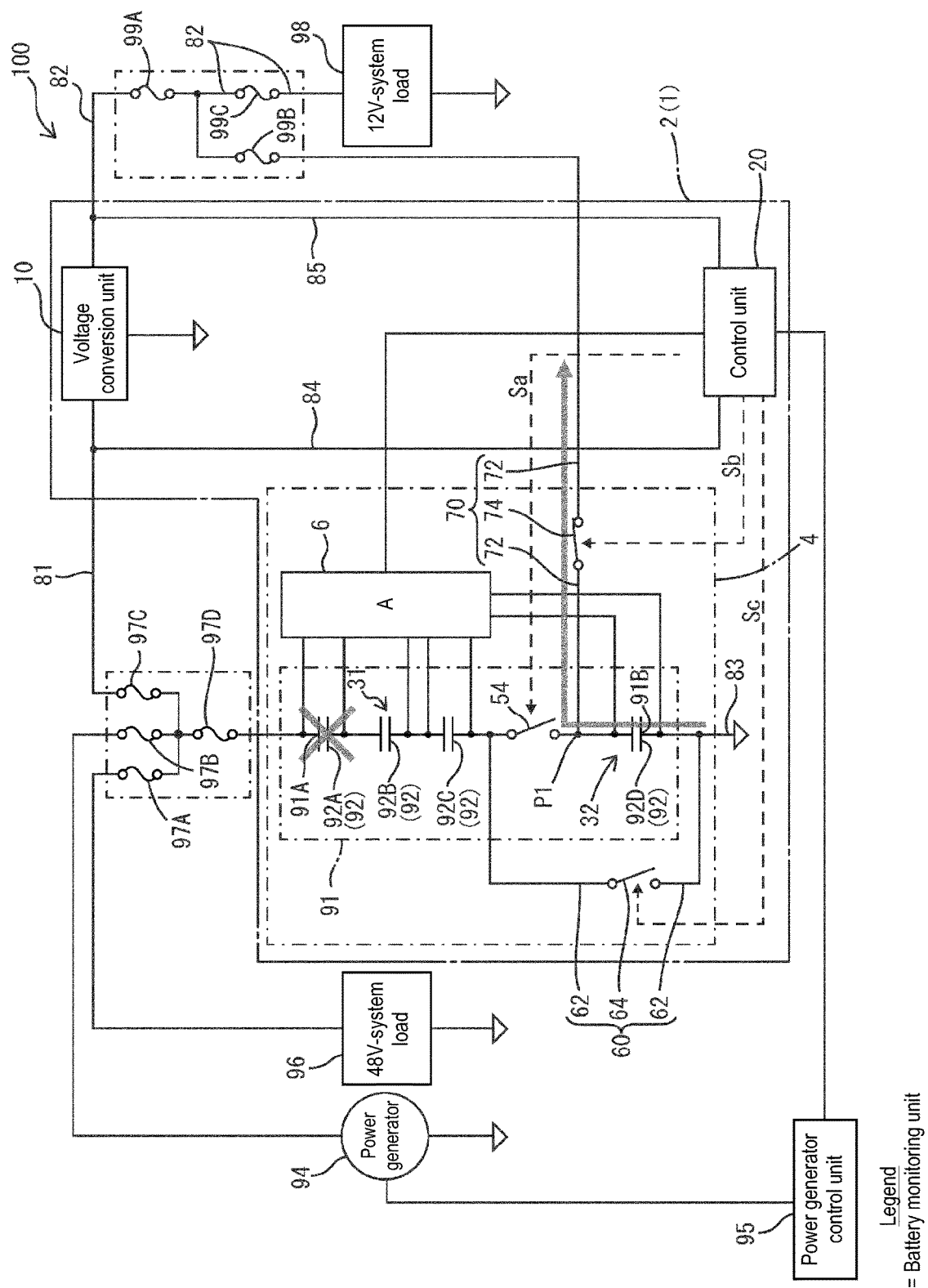
FIG. 4 is an explanatory diagram illustrating an operation in a case in which an abnormality has occurred at a high-potential-side power storage unit in the on-board power supply system in FIG. 1.

The control unit 20 performs the second switching control if the first abnormality signal (the high-potential-side abnormality signal) is output from the battery monitoring unit 6 and the second abnormality signal (the low-potential-side abnormality signal) is not output from the battery monitoring unit 6. For example, if a short-circuit failure occurs in the high-potential-side power storage unit 92A as illustrated in FIG. 4 and the high-potential-side abnormality detection unit 22 detects that the inter-terminal voltage V1 of the high-potential-side power storage unit 92A has become lower than the reference voltage Vth, the first abnormality signal (the high-potential-side abnormality signal) is provided from the battery monitoring unit 6 to the control unit 20. In response to this, the control unit 20 turns off the protective relay 54, turns on the bypass relay 74, and turns off the parallel relay 64, as illustrated in FIG. 4. Due to the control unit 20 performing the second switching control if the high-potential-side abnormality detection unit 22 detects an abnormality at the high-potential-side portion 31 as described above, the discharge from the high-potential-side power storage units 92A, 92B, and 92C to the first conduction path 81 is stopped, and electricity is discharged from the low-potential-side power storage unit 92D via the bypass conduction path 72. Note that if the second switching control is performed as described above, it suffices to stop the step-down operation of the voltage conversion unit 10.

Figure 5:
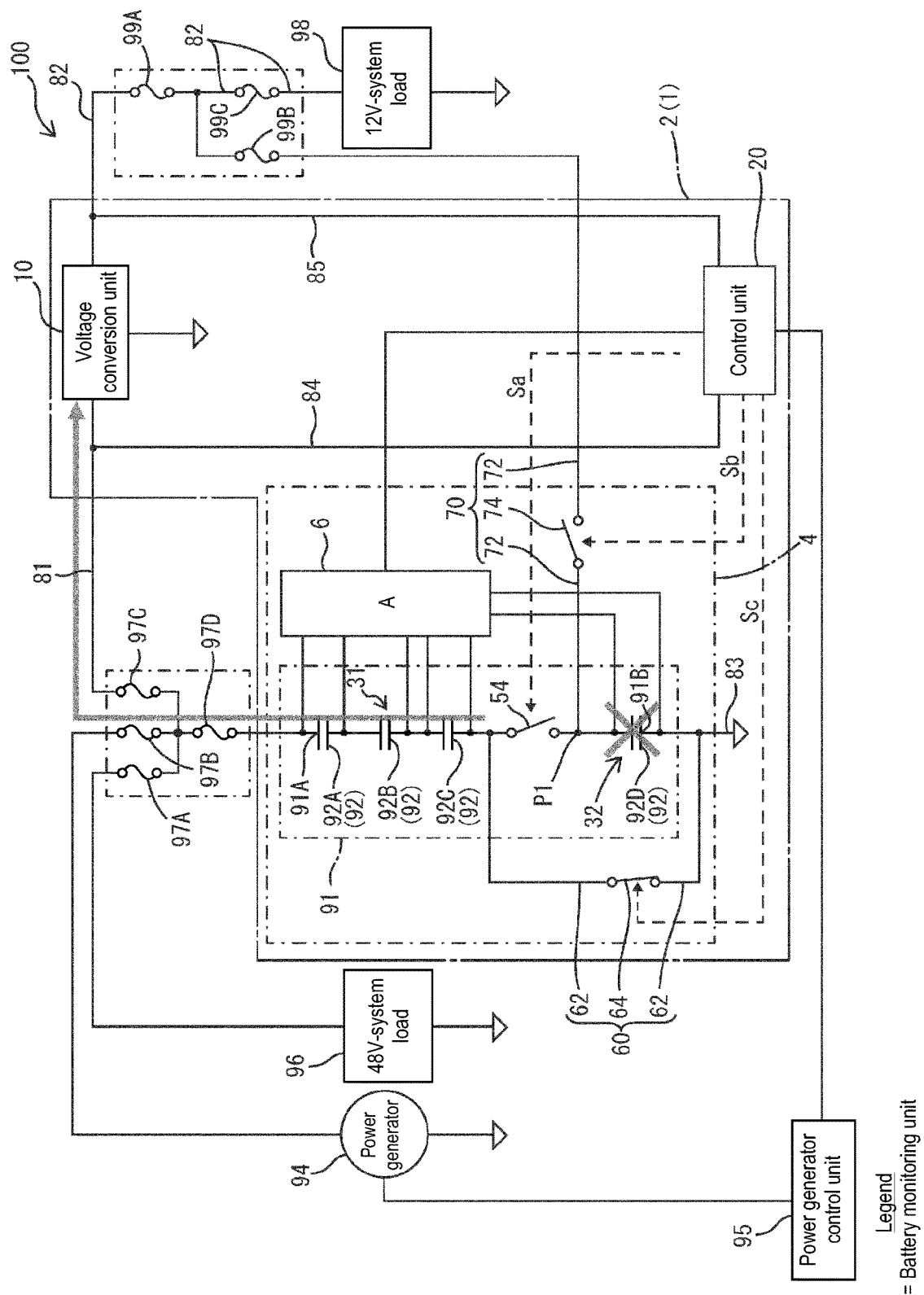
FIG. 5 is an explanatory diagram illustrating an operation in a case in which an abnormality has occurred at a low-potential-side power storage unit in the on-board power supply system in FIG. 1.

The control unit 20 performs the third switching control if the first abnormality signal (the high-potential-side abnormality signal) is not output from the battery monitoring unit 6 and the second abnormality signal (the low-potential-side abnormality signal) is output from the battery monitoring unit 6. For example, if a short-circuit failure occurs in the low-potential-side power storage unit 92D as illustrated in FIG. 5 and the low-potential-side abnormality detection unit 24 detects that the inter-terminal voltage V4 of the low-potential-side power storage unit 92D has become lower than the reference voltage Vth, the second abnormality signal (the low-potential-side abnormality signal) is provided from the battery monitoring unit 6 to the control unit 20. In response to this, the control unit 20 turns off the protective relay 54, turns off the bypass relay 74, and turns on the parallel relay 64, as illustrated in FIG. 5. Due to the control unit 20 performing the third switching control if the low-potential-side abnormality detection unit 24 detects an abnormality at the low-potential-side portion 32 as described above, power is supplied from the remaining power storage units 92, i.e., the high-potential-side power storage units 92A, 92B, and 92C, to the first conduction path 81 in a state such that the influence of the low-potential-side power storage unit 92D is suppressed. Note that if the third switching control is performed as described above, it suffices to cause the voltage conversion unit 10 to perform the step-down operation.

These functions of the control unit 20 may be realized by a hardware circuit, or may be realized through software processing by a microcomputer, etc. In the following, an example in which the functions of the control unit 20 are realized through software processing will be described, with reference to FIG. 3.

Figure 3:
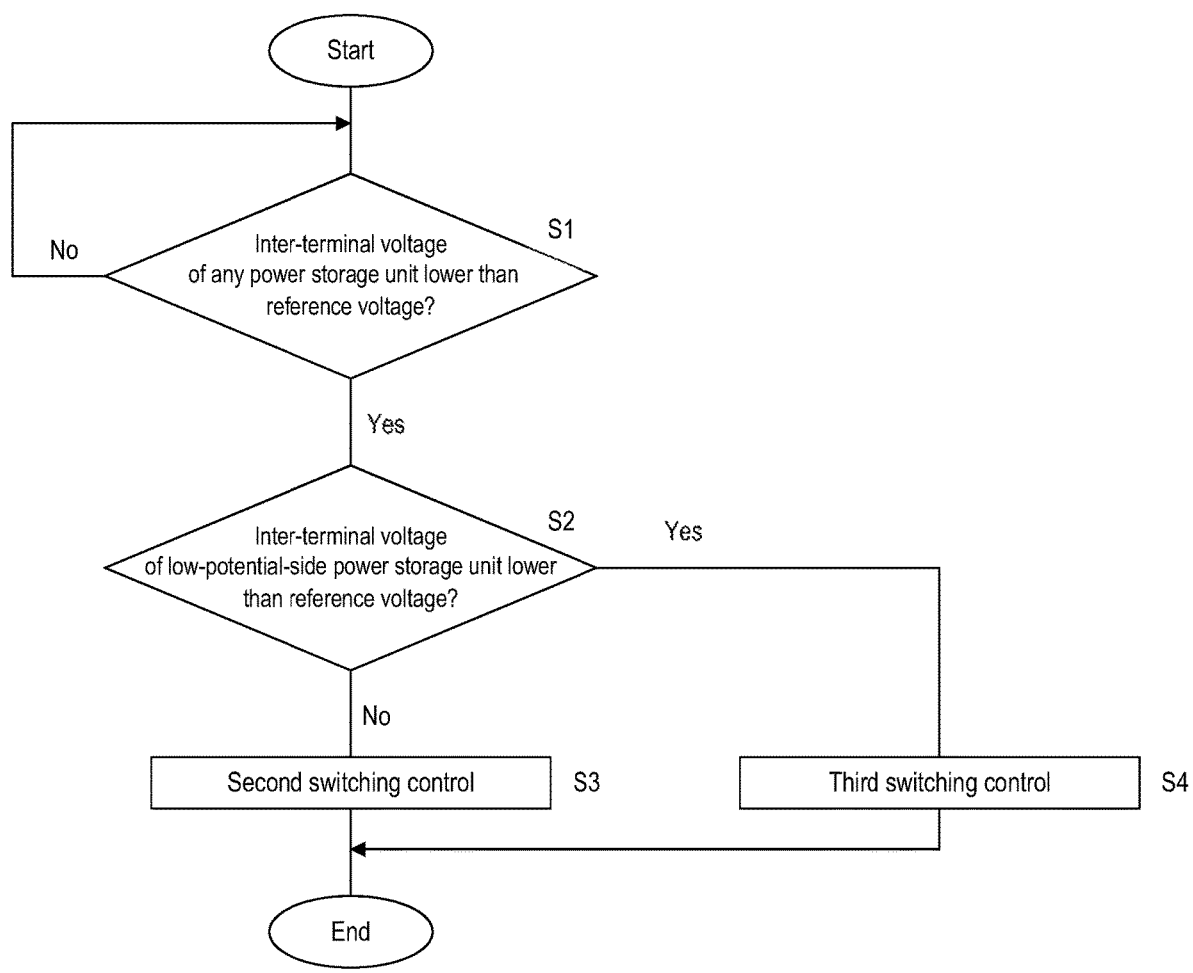
FIG. 3 is a flowchart illustrating an example flow of switching control executed by the control device in Embodiment 1.

The control unit 20 executes the control illustrated in FIG. 3 when a predetermined starting condition is fulfilled. Specifically, the control unit 20 executes the control illustrated in FIG. 3, for example, if the vehicle, in which the power supply device 1 is mounted, is activated (e.g., if an activation switch, such as an ignition switch, is switched from off to on). Note that the control unit 20 executes the first switching control as a default control when the control unit 20 starts executing the control illustrated in FIG. 3, and the control unit 20 causes the voltage conversion unit 10 to perform the step-down operation when the control unit 20 executes the first switching control.

If the control unit 20 starts the control illustrated in FIG. 3, the control unit 20 first performs the processing in step S1 and determines whether or not any one of the inter-terminal voltages V1, V2, V3, and V4 of the plurality of power storage units 92 constituting the power supply unit 91 is lower than the reference voltage Vth. Specifically, if neither the first abnormality signal (the high-potential-side abnormality signal) nor the second abnormality signal (the low-potential-side abnormality signal) is output from the battery monitoring unit 6, the result of step S1 is No and the determination in step S1 is repeated. That is, after the control unit 20 starts the control illustrated in FIG. 3, the control unit 20 continues to execute the first switching control as long as neither the first abnormality signal (the high-potential-side abnormality signal) nor the second abnormality signal (the low-potential-side abnormality signal) is output. Accordingly, the protective relay 54 is kept on, the bypass relay 74 is kept off, and the parallel relay 64 is kept off during this period. Furthermore, while the control unit 20 is executing the first switching control, the voltage conversion unit 10 is controlled by the control unit 20 or an unillustrated control circuit, and the voltage conversion unit 10 continues the step-down operation so as to apply the desired target voltage Vb (e.g., 12 V) to the second conduction path 82.

If the control unit 20 determines in step S1 that one of the inter-terminal voltages V1, V2, V3, and V4 of the plurality of power storage units 92 is lower than the reference voltage Vth, the result of step S1 is Yes and the control unit 20 performs the determination in step S2. Specifically, if either the first abnormality signal (the high-potential-side abnormality signal) or the second abnormality signal (the low-potential-side abnormality signal) is output from the battery monitoring unit 6, the result of step S1 is Yes and the determination in step S2 is performed.

In step S2, the control unit 20 determines whether or not the inter-terminal voltage V4 of the low-potential-side power storage unit 92D is lower than the reference voltage Vth. If the control unit 20 determines that the inter-terminal voltage V4 of the low-potential-side power storage unit 92D is lower than the reference voltage Vth, or specifically, if the first abnormality signal (the high-potential-side abnormality signal) is not output from the battery monitoring unit 6 and the second abnormality signal (the low-potential-side abnormality signal) is output from the battery monitoring unit 6, the result of step S2 is Yes and the third switching control is performed in step S4. In this case, the protective relay 54 is turned off, the bypass relay 74 is turned off, and the parallel relay 64 is turned on. Due to such control, the power from the remaining power storage units 92, i.e., the high-potential-side power storage units 92A, 92B, and 92C, is supplied to the first conduction path 81, and the voltage conversion unit 10 performs the step-down operation of stepping down the voltage applied to the first conduction path 81 and outputting the stepped-down voltage to the second conduction path 82. Accordingly, the desired voltage continues to be applied to the second conduction path 82 of the low-voltage system.

Note that if switching to the third switching control is performed as described above, the output voltage from the power supply unit 91 decreases, and thus, it is desirable to decrease the power generation voltage of the power generator 94 to avoid over-voltage. Accordingly, if the control unit 20 performs the third switching control in step S4, the control unit 20 transmits, to a power generator control unit 95 that controls the power generator 94, a signal indicating the third switching control (a suppression instruction signal that is an instruction to suppress voltage). For example, the control unit 20 continuously outputs the suppression instruction signal while the control unit 20 is executing the third switching control, and the power generator control unit 95 controls the power generator 94 so that, while the control unit 20 is performing the third switching control, the output voltage (the power generation voltage) of the power generator 94 is lower than the power generation voltage at normal times (the output voltage when the control unit 20 is performing the first switching control). Note that it suffices for the control unit 20 to output a predetermined normality signal to the power generator control unit 95 while the control unit 20 is executing the first switching control, and in this case, the power generator control unit 95 controls the power generator 94 so that, while the control unit 20 is performing the first switching control, the output voltage (the power generation voltage) of the power generator 94 is set to the power generation voltage at normal times.

If the control unit 20 determines in step S2 that the inter-terminal voltage V4 of the low-potential-side power storage unit 92D is not lower than the reference voltage Vth, or specifically, if the first abnormality signal (the high-potential-side abnormality signal) is output from the battery monitoring unit 6 and the second abnormality signal (the low-potential-side abnormality signal) is not output from the battery monitoring unit 6, the result of step S2 is No and the second switching control is performed in step S3. In this case, the protective relay 54 is turned off, the bypass relay 74 is turned on, and the parallel relay 64 is turned off. Due to such control, power from the low-potential-side power storage unit 92D is transmitted via the bypass conduction path 72, and a voltage comparable to the output voltage of the low-potential-side power storage unit 92D continues to be applied to the second conduction path 82. The inter-terminal voltage of the low-potential-side power storage unit 92D when the low-potential-side power storage unit 92D is fully charged is around 12 V (i.e., comparable to the voltage applied to the second conduction path 82 by the voltage conversion unit 10 when the first switching control is executed). Accordingly, a voltage comparable to that at normal times (when the first switching control is executed) can be more readily applied to the second conduction path 82 when the second switching control is executed.

Next, examples of effects of the present configuration will be described.

In the power supply device 1 and the control device 2 illustrated in FIG. 1, etc., the protective relay 54 is turned on and the bypass relay 74 is turned off when the control unit 20 performs the first switching control. During this state, a relatively high voltage can be applied to the first conduction path 81, which serves as the conduction path of the high-voltage system, based on power supplied from the power generator 94 and the power supply unit 91, and a stepped-down voltage can be applied to the second conduction path 82, which serves as the conduction path of the low-voltage system, due to the operation of the voltage conversion unit 10. Accordingly, power can be supplied to both the conduction path of the high-voltage system and the conduction path of the low-voltage system, based on power from the power supply unit 91. Furthermore, the control unit 20 can also perform the second switching control, and in this case, the protective relay 54 is turned off and the bypass relay 74 is turned on. If the second switching control is executed by the control unit 20, the high-potential-side power storage units 92A, 92B, and 92C and the low-potential-side power storage unit 92D (specifically, the high-potential-side power storage unit 92C and the low-potential-side power storage unit 92D) are electrically disconnected because the protective relay 54 is turned off, and power supplied from the low-potential-side power storage unit 92D is supplied to the second conduction path 82-side via the bypass conduction path 72 because the bypass relay 74 is turned on. Due to such a configuration, even if an abnormality occurs in the high-potential-side power storage units 92A, 92B, and 92C, which are parts of the power supply unit 91 (a power supply unit disposed at the high-voltage side), power based on the low-potential-side power storage unit 92D can be supplied to the low-voltage system while the connection between the high-potential-side power storage units 92A, 92B, and 92C and the low-potential-side power storage unit 92D is reliably interrupted if the second switching control is performed, and a situation in which power based on the power supply unit 91 stops being supplied to the low-voltage system can be more readily avoided.

The control device 2 includes the high-potential-side abnormality detection unit 22, which detects abnormalities at the high-potential-side portion 31, which is located farther toward the high-potential side than the protective relay 54 in the power supply unit 91. The control unit 20 functions such that the control unit 20 performs the first switching control on the condition that the high-potential-side abnormality detection unit 22 is not detecting any abnormality at the high-potential-side portion 31 and such that the control unit 20 performs the second switching control if the high-potential-side abnormality detection unit 22 detects an abnormality at the high-potential-side portion 31.

Due to the control unit 20 performing the first switching control on the condition that an abnormality is not being detected at the high-potential-side portion 31, which is located farther toward the high-potential side than the protective relay 54, this control device 2 can supply power based on the power supply unit 91 to both the conduction path of the high-voltage system and the conduction path of the low-voltage system in this case. On the other hand, if an abnormality is detected at the high-potential-side portion 31, which is located farther toward the high-potential side than the protective relay 54, the control unit 20 performs the second switching control, and thus, the connection between the high-potential-side power storage units (the high-potential-side power storage units 92A, 92B, and 92C) present at the side at which the abnormality has occurred and the low-potential-side power storage unit 92D can be reliably interrupted, and the influence of the abnormality can be suppressed from spreading to the low-potential-side power storage unit 92D. Furthermore, power based on the low-potential-side power storage unit 92D can be supplied to the low-voltage system in a state as described above in which the influence of the abnormality is suppressed. Accordingly, power can be stably supplied to the low-voltage system more readily even if an abnormality occurs near the high-potential-side power storage units 92A, 92B, and 92C.

The control device 2 includes the parallel relay 64, which is connected in parallel with the protective relay 54 and the low-potential-side power storage unit 92D. The parallel relay 64 electrically connects the high-potential-side power storage units 92A, 92B, and 92C (specifically, the high-potential-side power storage unit 92C) and the third conduction path 83 (the conduction path to which the terminal 91B, which has the lowest potential in the power supply unit 91, is electrically connected) when the parallel relay 64 is turned on and electrically disconnects the high-potential-side power storage unit 92C and the third conduction path 83 when the parallel relay 64 is turned off. The control unit 20 is configured to at least perform the third switching control for turning off the protective relay 54 and turning on the parallel relay 64, and functions so as to turn off the parallel relay 64 when executing the first switching control and the second switching control.

In this control device 2, the protective relay 54 is turned off and the parallel relay 64 is turned on if the control unit 20 performs the third switching control. That is, the connection between the low-potential-side power storage unit 92D and the high-potential-side power storage units is electrically interrupted, and the high-potential-side power storage unit 92C and the third conduction path 83 are electrically connected. Accordingly, even if an abnormality occurs in the low-potential-side power storage unit 92D, power based on the high-potential-side power storage units 92A, 92B, and 92C can be supplied to the first conduction path 81 while the influence of the abnormality having occurred at the low-potential-side power storage unit 92D is suppressed if the third switching control is performed, and a stepped-down voltage can also be applied to the second conduction path 82, which serves as the conduction path of the low-voltage system, due to the operation of the voltage conversion unit 10.

The control device 2 includes the low-potential-side abnormality detection unit 24, which detects abnormalities at the low-potential-side portion 32, which is located farther toward the low-potential side than the protective relay 54 in the power supply unit 91. The control unit 20 functions such that the control unit 20 performs the first switching control on the condition that the low-potential-side abnormality detection unit 24 is not detecting any abnormality at the low-potential-side portion 32 and such that the control unit 20 performs the third switching control if the low-potential-side abnormality detection unit 24 detects an abnormality at the low-potential-side portion 32.

Due to the control unit 20 performing the first switching control on the condition that an abnormality is not being detected at the low-potential-side portion 32, which is located farther toward the low-potential side than the protective relay 54, this control device 2 can supply power based on the power supply unit 91 to both the conduction path of the high-voltage system and the conduction path of the low-voltage system in this case. On the other hand, if an abnormality is detected at the low-potential-side portion 32, which is located farther toward the low-potential side than the protective relay 54, the control unit 20 performs the third switching control, and thus, the connection between the low-potential-side power storage unit 92D present at the side at which the abnormality has occurred and the high-potential-side power storage units (the high-potential-side power storage units 92A, 92B, and 92C) can be reliably interrupted, and the influence of the abnormality can be suppressed from spreading to the high-potential-side power storage units 92A, 92B, and 92C. Furthermore, power based on the high-potential-side power storage units 92A, 92B, and 92C can be supplied to the low-voltage system in a state as described above in which the influence of the abnormality is suppressed. Accordingly, power can be stably supplied to the low-voltage system more readily even if an abnormality occurs near the low-potential-side power storage unit 92D.

Embodiment 2

Next, Embodiment 2 will be described.

An on-board power supply device 201 (also referred to in the following as a "power supply device 201") in Embodiment 2 differs from the power supply device 1 in Embodiment 1 only in that a diode 274 is provided in place of the bypass relay 74 and control related to the bypass relay 74 is omitted in the first switching control, the second switching control, and the third switching control, and is otherwise the same as the power supply device 1 in Embodiment 1. A control device 202 for an on-board power supply unit (also referred to in the following as a "control device 202") in Embodiment 2 also differs from the control device 2 in Embodiment 1 only in terms of these points, and is otherwise the same as the control device 2 in Embodiment 1. Furthermore, an on-board power supply system 200 also differs from the on-board power supply system 100 described in Embodiment 1 only in terms of these points, and is otherwise the same as the on-board power supply system 100 illustrated in FIG. 1, etc. Accordingly, in the following description in Embodiment 2, detailed description of points that are the same as configurations described in Embodiment 1 are omitted, and in FIG. 6, the same reference symbols as those provided to the configurations in Embodiment 1 (FIG. 1, etc.) are provided to points that are the same as configurations described in Embodiment 1.

In Embodiment 2, a bypass circuit portion 270 is provided in place of the bypass circuit portion 70 (FIG. 1). In this configuration as well, a bypass conduction path 72 similar to that in Embodiment 1 is provided, and the bypass conduction path 72 serves as a path for supplying power to the second conduction path 82 from the first position P1 between power storage units in the power supply unit 91. The diode 274 is provided in place of the bypass relay 74 (FIG. 1) along this bypass conduction path 72. The diode 274 is interposed in the bypass conduction path 72, and the anode of the diode 274 is electrically connected to the first position P1-side and the cathode of the diode 274 is electrically connected to the second conduction path 82-side.

In Embodiment 2, the battery monitoring unit 6 is also configured similarly as in Embodiment 1 and functions similarly as in Embodiment 1. The control unit 20 performs the first switching control if neither the first abnormality signal (the high-potential-side abnormality signal) nor the second abnormality signal (the low-potential side abnormality signal) is output from the battery monitoring unit 6. Hence, the control unit 20 performs the first switching control on the condition that the high-potential-side abnormality detection unit 22 is not detecting any abnormality at the high-potential-side portion 31 and the low-potential-side abnormality detection unit 24 is not detecting any abnormality at the low-potential-side portion 32. With the first switching control, the protective relay 54 is turned on and the parallel relay 64 is turned off.

The control unit 20 performs the second switching control if the first abnormality signal (the high-potential-side abnormality signal) is output from the battery monitoring unit 6 and the second abnormality signal (the low-potential-side abnormality signal) is not output from the battery monitoring unit 6. With the second switching control, the protective relay 54 is turned off and the parallel relay 64 is also turned off. If the second switching control is performed as described above, it suffices to stop the step-down operation of the voltage conversion unit 10. In this case, while the supply of power via the voltage conversion unit 10 stops, power from the low-potential-side power storage unit 92D is immediately supplied to the second conduction path 82 via the diode 274 once the voltage of the second conduction path 82 decreases to a certain extent. Accordingly, the supply of power to the low-voltage system is quickly continued.

The control unit 20 performs the third switching control if the first abnormality signal (the high-potential-side abnormality signal) is not output from the battery monitoring unit 6 and the second abnormality signal (the low-potential-side abnormality signal) is output from the battery monitoring unit 6. With the third switching control, the protective relay 54 is turned off and the parallel relay 64 is turned on. If the third switching control is performed as described above, the voltage conversion unit 10 is caused to perform the step-down operation.

Figure 6:
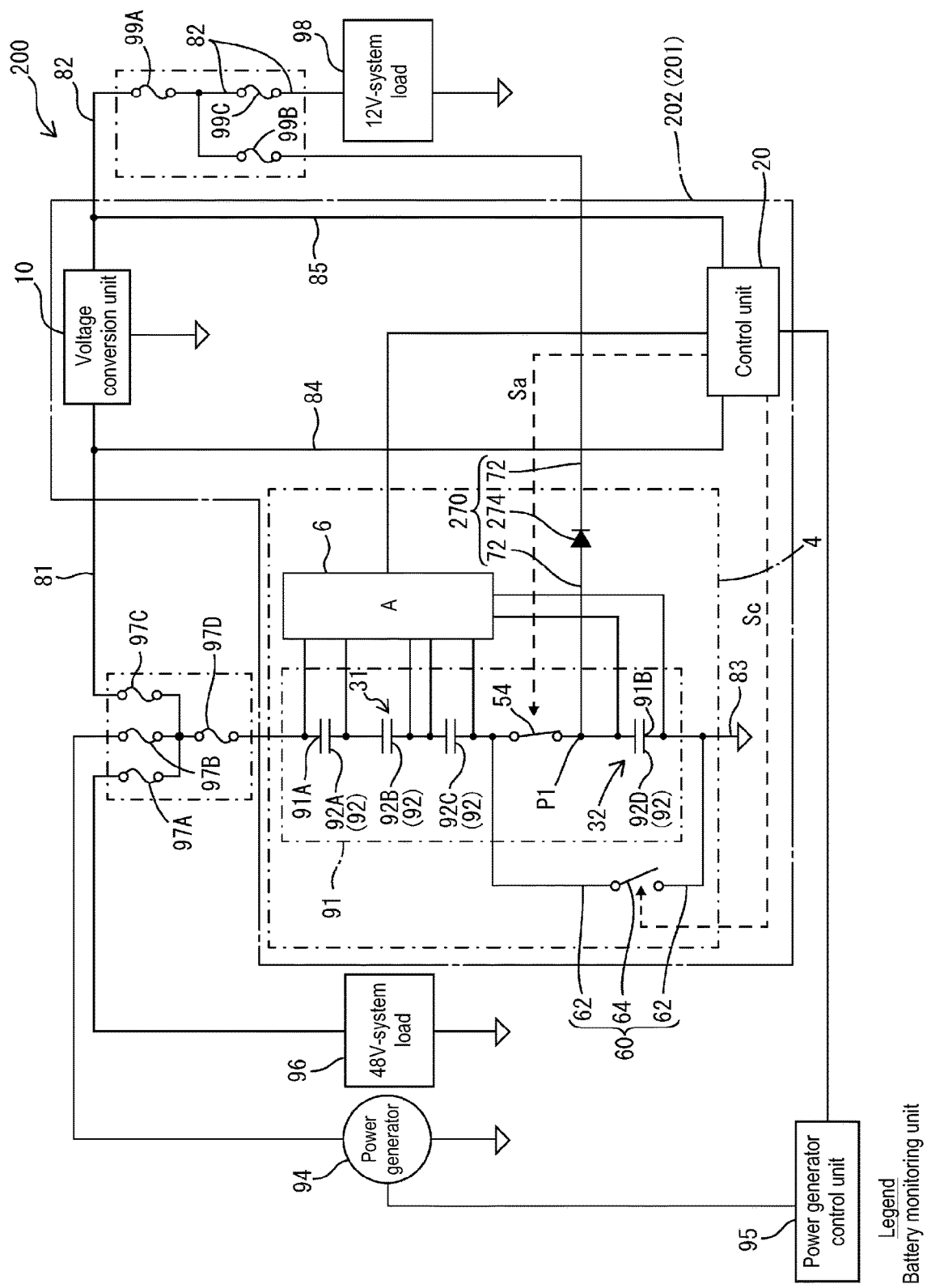
FIG. 6 is a block diagram schematically illustrating an example of an on-board power supply system including an on-board power supply device and a control device for an on-board power supply unit in Embodiment 2.

Hence, also in the control device 202 illustrated in FIG. 6, the protective relay 54 is turned on when the control unit 20 performs the first switching control. During this state, a relatively high voltage can be applied to the first conduction path 81, which serves as the conduction path of the high-voltage system, based on power supplied from the power supply unit 91, and a stepped-down voltage can be applied to the second conduction path 82, which serves as the conduction path of the low-voltage system, due to the operation of the voltage conversion unit 10. Accordingly, power can be supplied to both the conduction path of the high-voltage system and the conduction path of the low-voltage system, based on power from the power supply unit 91. Furthermore, the control unit 20 can also perform the second switching control, and in this case, the protective relay 54 is turned off. If the second switching control is executed by the control unit 20, the protective relay 54 is turned off, and thus, the high-potential-side power storage units and the low-potential-side power storage unit 92D are electrically disconnected. In this case, even if the desired voltage stops being output from the voltage conversion unit 10 to the second conduction path 82, a discharge current from the low-potential-side power storage unit 92D flows into the second conduction path 82-side via the bypass conduction path 72 once the cathode-side potential of the diode 274, which is disposed in the bypass conduction path 72, becomes lower than the anode-side potential to a certain extent. Due to such a configuration, even if an abnormality occurs in the high-potential-side power storage units, which are parts of the power supply unit 91 (a power supply unit disposed at the high-voltage side), power based on the low-potential-side power storage unit 92D can be supplied to the low-voltage system while the connection between the high-potential-side power storage units and the low-potential-side power storage unit 92D is reliably interrupted if the second switching control is performed, and a situation in which power based on the power supply unit 91 stops being supplied to the low-voltage system can be more readily avoided.

Other Embodiments

The present disclosure is not limited to the embodiments described by means of the description above and the drawings, and embodiments such as those in the following, for example, are also included in the technical scope of the present disclosure.

In the above-described embodiments, examples in which the power supply unit 91 is constituted by four power storage units 92 were described. However, the number of power storage units 92 constituting the power supply unit 91 need not be four, as long as there are a plurality of power storage units 92 constituting the power supply unit 91.

In the above-described embodiments, examples in which the parallel circuit portion 60 is provided were described. However, a configuration in which the parallel circuit portion 60 is not provided may also be used.

In Embodiment 2, the diode 274, which is configured as a single body, is used. However, a body diode of a MOSFET may be disposed at the same position as the diode 274 in FIG. 6. In this case, second switching control that is the same as that in Embodiment 1 may be performed to turn on the MOSFET if the high-potential-side abnormality detection unit detects an abnormality at the high-potential-side portion.

In the above-described embodiments, the high-potential-side abnormality detection unit 22 is described as an example of the internal abnormality detection unit 23. However, a voltage conversion unit abnormality detection unit that detects abnormalities in the voltage conversion unit 10 may be provided in place of or in combination with the high-potential-side abnormality detection unit 22. In this example, at least the position of the voltage conversion unit 10 corresponds to one example of a "predetermined in-device position". In this case, the voltage conversion unit abnormality detection unit may detect, for example, an over-current state in which the output current that is output from the voltage conversion unit 10 or the input current that is input to the voltage conversion unit 10 becomes greater than or equal to a predetermined current threshold as an "abnormality at a predetermined in-device position", or may detect an abnormal voltage state in which the output voltage that is output from the voltage conversion unit 10 or the input voltage that is input to the voltage conversion unit 10 becomes greater than or equal to a predetermined first voltage threshold or lower than or equal to a predetermined second voltage threshold as an "abnormality at a predetermined in-device position". Alternatively, an excessively heated state in which the temperature at a predetermined position in the voltage conversion unit 10 (e.g., the temperature near the switching element) becomes higher than or equal to a predetermined temperature threshold may also be detected as an "abnormality at a predetermined in-device position". In this example, it suffices to switch to the first switching control if the voltage conversion unit abnormality detection unit is not detecting the "abnormality at a predetermined in-device position" and to switch to the second switching control if the voltage conversion unit abnormality detection unit detects the "abnormality at a predetermined in-device position".

The invention claimed is:

1. A control device for an on-board power supply unit, comprising:

a voltage conversion unit that is connected to a first conduction path and a second conduction path and performs a step-down operation of stepping down a voltage applied to the first conduction path and applying the stepped-down voltage to the second conduction path, the first conduction path being a path on which power is supplied from an on-board power supply unit including a plurality of power storage units connected in series, and the second conduction path serving as a path for supplying power to a load;

a bypass conduction path that serves as a path for supplying power to the second conduction path from a first node between power storage units in the on-board power supply unit;

a bypass relay that is interposed in the bypass conduction path, the bypass relay permitting power to be supplied from the first node to the second conduction path-side when the bypass relay is turned on and interrupting the supply of power from the first position-side to the second conduction path-side when the bypass relay is turned off;

a protective relay that is connected in series with the plurality of power storage units in the on-board power supply unit and is disposed between a pair of the power storage units at a position farther toward a high-potential side than the first node, the protective relay switching an inter-power storage unit path between a low-potential-side power storage unit of the pair of the power storage units disposed farther toward a low-potential side than the protective relay and a high-potential-side power storage unit of the pair of the power storage units disposed farther toward the high-potential side than the protective relay in the on-board power supply unit to an electrically connected state when the protective relay is turned on and switching the inter-power storage unit path to an electrically disconnected state when the protective relay is turned off, the protective relay connected in parallel with the bypass relay at the first node; and a control unit that switches at least between first switching control for turning on the protective relay and turning off the bypass relay and second switching control for turning off the protective relay and turning on the bypass relay.

2. The control device for an on-board power supply unit, according to claim 1, further comprising:
an internal abnormality detection unit that detects an abnormality at a predetermined in-device position located farther toward the high-potential side than the protective relay, wherein
the control unit switches to the first switching control if the internal abnormality detection unit is not detecting an abnormality at the predetermined in-device position and switches to the second switching control if the internal abnormality detection unit detects an abnormality at the in-device position.

3. The control device for an on-board power supply unit, according to claim 2, wherein the internal abnormality detection unit includes a high-potential-side abnormality detection unit that detects an abnormality at a high-potential-side portion located farther toward the high-potential side than the protective relay in the on-board power supply unit, and
the control unit switches to the first switching control if the high-potential-side abnormality detection unit is not detecting an abnormality at the high-potential-side portion and switches to the second switching control if the high-potential-side abnormality detection unit detects an abnormality at the high-potential-side portion.

4. The control device for an on-board power supply unit, according to claim 3, further comprising:
a parallel relay that is connected in parallel with the protective relay and the low-potential-side power storage unit, the parallel relay electrically connecting the high-potential-side power storage unit and a third conduction path when the parallel relay is turned on and electrically disconnecting the high-potential-side power storage unit and the third conduction path when the parallel relay is turned off, the third connection path being a path to which a terminal having the lowest potential in the on-board power supply unit is electrically connected, wherein
the control unit is configured to be capable of switching to third switching control for turning off the protective relay and turning on the parallel relay, and turns off the parallel relay when executing the first switching control and the second switching control.

5. The control device for an on-board power supply unit, according to claim 2, further comprising:
a parallel relay that is connected in parallel with the protective relay and the low-potential-side power storage unit, the parallel relay electrically connecting the high-potential-side power storage unit and a third conduction path when the parallel relay is turned on and electrically disconnecting the high-potential-side power storage unit and the third conduction path when the parallel relay is turned off, the third connection path being a path to which a terminal having the lowest potential in the on-board power supply unit is electrically connected, wherein
the control unit is configured to be capable of switching to third switching control for turning off the protective relay and turning on the parallel relay, and turns off the parallel relay when executing the first switching control and the second switching control.

6. The control device for an on-board power supply unit, according to claim 1, further comprising:
a parallel relay that is connected in parallel with the protective relay and the low-potential-side power storage unit, the parallel relay electrically connecting the high-potential-side power storage unit and a third conduction path when the parallel relay is turned on and electrically disconnecting the high-potential-side power storage unit and the third conduction path when the parallel relay is turned off, the third connection path being a path to which a terminal having the lowest potential in the on-board power supply unit is electrically connected, wherein
the control unit is configured to be capable of switching to third switching control for turning off the protective relay and turning on the parallel relay, and turns off the parallel relay when executing the first switching control and the second switching control.

7. The control device for an on-board power supply unit, according to claim 6, further comprising:
a low-potential-side abnormality detection unit that detects an abnormality at a low-potential-side portion located farther toward the low-potential side than the protective relay in the on-board power supply unit, wherein
the control unit switches to the first switching control if the low-potential-side abnormality detection unit is not detecting an abnormality at the low-potential-side portion and switches to the third switching control if the low-potential-side abnormality detection unit detects an abnormality at the low-potential-side portion.

8. An on-board power supply device comprising:
the control device for an on-board power supply unit, according to claim 1; and
the on-board power supply unit.

9. A control device for an on-board power supply unit, comprising:
a voltage conversion unit that is connected to a first conduction path and a second conduction path and performs a step-down operation of stepping down a voltage applied to the first conduction path and applying the stepped-down voltage to the second conduction path, the first conduction path being a path on which power is supplied from an on-board power supply unit including a plurality of power storage units connected in series, and the second conduction path serving as a path for supplying power to a load;
a bypass conduction path that serves as a path for supplying power to the second conduction path from a first node between power storage units in the on-board power supply unit;
a diode that is interposed in the bypass conduction path, the diode having an anode that is electrically connected to the first node and a cathode that is electrically connected to the second conduction path-side;
a protective relay that is connected in series with the plurality of power storage units in the on-board power supply unit and is disposed between a pair of the power storage units at a position farther toward a high-potential side than the first node, the protective relay switching an inter-power storage unit path between a low-potential-side power storage unit of the pair of the power storage units disposed farther toward a low-potential side than the protective relay and a high-potential-side power storage unit of the pair of the power storage units disposed farther toward the high-potential side than the protective relay in the on-board power supply unit to an electrically connected state when the protective relay is turned on and switching the inter-power storage unit path to an electrically disconnected state the protective relay is turned off the protective relay connected in parallel with the diode at the first node; and a control unit that switches at least between first switching control for turning on the protective relay and second switching control for turning off the protective relay.

10. The control device for an on-board power supply unit, according to claim 9, further comprising:

an internal abnormality detection unit that detects an abnormality at a predetermined in-device position located farther toward the high-potential side than the protective relay, wherein the control unit switches to the first switching control if the internal abnormality detection unit is not detecting an abnormality at the predetermined in-device position and switches to the second switching control if the internal abnormality detection unit detects an abnormality at the in-device position.

11. The control device for an on-board power supply unit, according to claim 9, further comprising:

a parallel relay that is connected in parallel with the protective relay and the low-potential-side power storage unit, the parallel relay electrically connecting the high-potential-side power storage unit and a third conduction path when the parallel relay is turned on and electrically disconnecting the high-potential-side power storage unit and the third conduction path when the parallel relay is turned off, the third connection path being a path to which a terminal having the lowest potential in the on-board power supply unit is electrically connected, wherein the control unit is configured to be capable of switching to third switching control for turning off the protective relay and turning on the parallel relay, and turns off the parallel relay when executing the first switching control and the second switching control.

* * * * *